US012689432B2

(12) United States Patent
Zhu

(10) Patent No.: US 12,689,432 B2
(45) Date of Patent: Jul. 21, 2026

(54) SATELLITE COMMUNICATION METHOD AND APPARATUS, AND CORE NETWORK ELEMENT AND STORAGE MEDIUM

(71) Applicant: BEIJING XIAOMI MOBILE SOFTWARE CO., LTD., Beijing (CN)

(72) Inventor: Yajun Zhu, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 667 days.

(21) Appl. No.: 18/012,466

(22) PCT Filed: Jul. 9, 2020

(86) PCT No.: PCT/CN2020/101163
§ 371 (c)(1),
(2) Date: Dec. 22, 2022

(87) PCT Pub. No.: WO2022/006826
PCT Pub. Date: Jan. 13, 2022

(65) Prior Publication Data
US 2023/0268988 A1 Aug. 24, 2023

(51) Int. Cl.
*H04B 7/185* (2006.01)
*H04L 12/46* (2006.01)
(52) U.S. Cl.
CPC ..... *H04B 7/18521* (2013.01); *H04B 7/18513* (2013.01); *H04L 12/4604* (2013.01)
(58) Field of Classification Search
CPC ............... H04B 7/185; H04B 7/18513; H04B 7/18519; H04B 7/18521; H04B 7/18563; H04L 12/4604; H04L 41/0803; H04L 41/12; H04W 84/06
See application file for complete search history.

(56) References Cited

U.S. PATENT DOCUMENTS

| | | | | |
|---|---|---|---|---|
| 9,686,027 | B2 * | 6/2017 | Yeshanov | .......... H04B 17/3912 |
| 10,419,106 | B1 * | 9/2019 | Liu | ....................... H04L 67/568 |
| 10,875,668 | B2 * | 12/2020 | Bigras | .................. B64G 1/2425 |
| 11,542,040 | B1 * | 1/2023 | Hemmati | .......... H04B 7/18576 |
| 2002/0022452 | A1 * | 2/2002 | Toya | .................... H04B 7/1853 |
| | | | | 455/13.1 |
| 2018/0006370 | A1 * | 1/2018 | Hreha | ................... H04B 7/1851 |
| 2019/0082481 | A1 * | 3/2019 | Ravishankar | ......... H04W 76/10 |
| 2021/0297147 | A1 * | 9/2021 | Qaise | ..................... H04W 84/06 |
| 2021/0410198 | A1 * | 12/2021 | Qiao | ................. H04W 72/1263 |

(Continued)

FOREIGN PATENT DOCUMENTS

CN 105553711 A 4/2016

OTHER PUBLICATIONS

PCT/CN2020/101163, English translation of International Search Report dated Mar. 25, 2021, 2 pages.

*Primary Examiner* — Hadi S Armouche
(74) *Attorney, Agent, or Firm* — Cozen O'Connor

(57) ABSTRACT

A satellite communication method includes communicating with a user equipment UE via an inter-satellite link or an intra-satellite link by a core network using a first communication satellite; and communicating with a service server via the inter-satellite link or the intra-satellite link by the core network. The service server and the core network may be on the same or different satellites. A satellite apparatus, core network element and storage medium are also discussed.

18 Claims, 3 Drawing Sheets

(56)          References Cited

U.S. PATENT DOCUMENTS

| | | | | |
|---|---|---|---|---|
| 2022/0014265 | A1* | 1/2022 | Greenidge | H04B 7/1851 |
| 2022/0052753 | A1* | 2/2022 | Speidel | H04B 7/18513 |
| 2025/0015880 | A1* | 1/2025 | Zhu | H04B 7/18513 |
| 2025/0273873 | A1* | 8/2025 | Zhang | H01Q 1/246 |
| 2025/0324389 | A1* | 10/2025 | Li | H04W 64/00 |

* cited by examiner

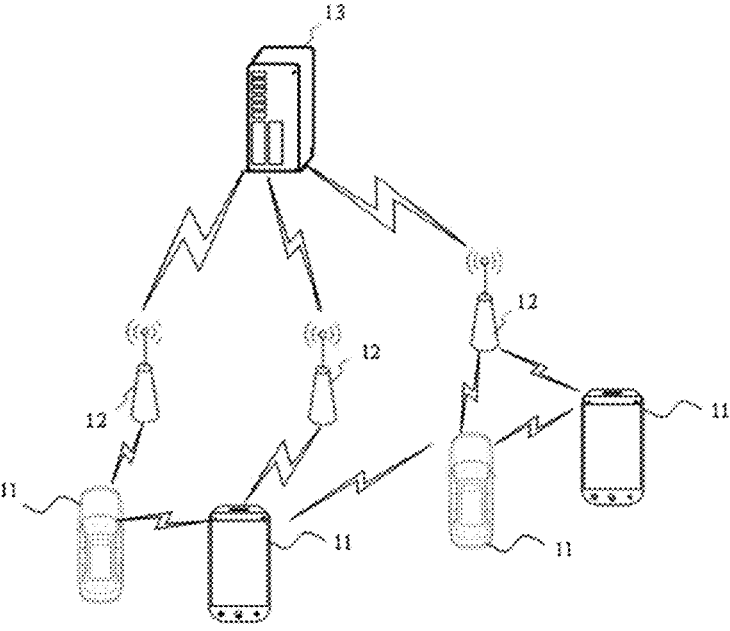
FIG. 1
| |
|---|
| communicating with a user equipment UE via an inter-satellite link or an intra-satellite link by a core network using a first communication satellite    201 |
| |
|---|
| communicating with a service server via the inter-satellite link or the intra-satellite link by the core network    202 |
FIG. 2
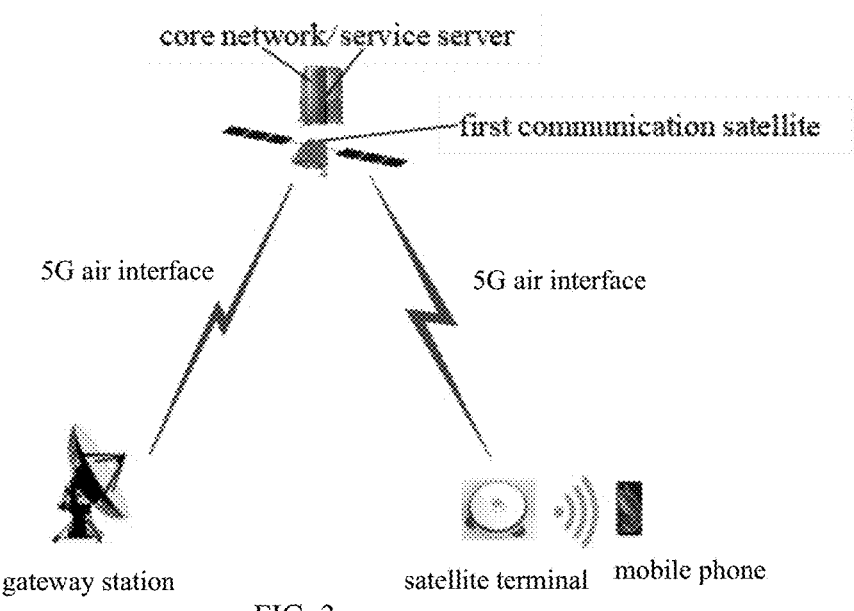
FIG. 3

SATELLITE COMMUNICATION METHOD AND APPARATUS, AND CORE NETWORK ELEMENT AND STORAGE MEDIUM

CROSS-REFERENCE TO RELATED APPLICATION

The present application is a national phase entry under 35 USC § 371 of International Application PCT/CN2020/101163, filed Jul. 9, 2020, the entire disclosures of which are incorporated herein by reference.

TECHNICAL FIELD

The present disclosure relates to a satellite communication field, and more particularly to a satellite communication method, a satellite communication apparatus, a core network element and a storage medium.

BACKGROUND

Satellite communication is considered to be an important direction for the development of the future wireless communication technology. Satellite communication refers to the communication carried out by radio communication devices on the ground using satellites as relays. A satellite communication system includes a satellite part and a ground part. Due to the distance above the earth, a satellite communication system typically has a large communication range and is not easily affected by land disasters. The satellite communication is used as a supplementary access method of mobile communication, which solves problems of small coverage and high construction cost of a mobile communication system. However, for a communication process based on a satellite, a communication link needs to be connected from the satellite to a core network on the ground, and therefore the communication link is long and the delay is relatively large.

SUMMARY

In view of this, embodiments of the present disclosure provide a satellite communication method, a satellite communication apparatus, a core network element and a storage medium.

According to a first aspect of embodiments of the present disclosure, a satellite communication method is provided. The method includes communicating with a user equipment UE via an inter-satellite link or an intra-satellite link by a core network using a first communication satellite; and communicating with a service server via the inter-satellite link or the intra-satellite link by the core network.

According to a second aspect of embodiments of the present disclosure, a core network element is provided. The core network element includes a processor, a transceiver, and a memory for storing executable programs capable of being run by the processor. The processor is configured to execute the executable programs to perform steps of the above-mentioned satellite communication method.

According to a third aspect of embodiments of the present disclosure, a non-transitory computer readable storage medium is provided. The non-transitory computer readable storage medium has stored therein executable programs that, when executed by a processor, cause the processor to perform steps of the above-mentioned satellite communication method.

BRIEF DESCRIPTION OF THE DRAWINGS

The accompanying drawings, which are incorporated in and constitute a part of this specification, illustrate embodiments consistent with the present disclosure and, together with the description, serve to explain the principles of the present disclosure.

FIG. 1 is a schematic diagram illustrating a wireless communication system according to an illustrative embodiment.

FIG. 2 is a flow chart illustrating a satellite communication method according to an illustrative embodiment.

FIG. 3 is a schematic diagram illustrating a satellite communication architecture according to an illustrative embodiment.

DETAILED DESCRIPTION

Figure 4:
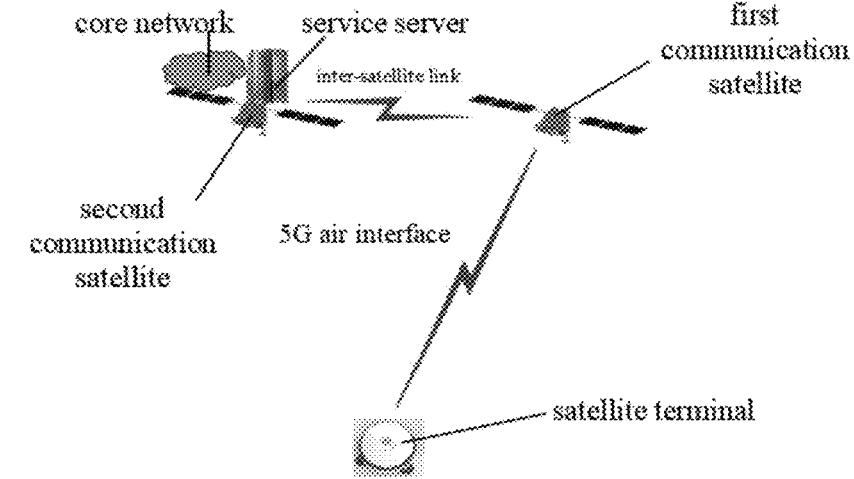
FIG. 4 is a schematic diagram illustrating another satellite communication architecture according to an illustrative embodiment.

Reference will now be made in detail to illustrative embodiments, examples of which are illustrated in the accompanying drawings. The following description refers to the accompanying drawings in which the same numbers in different drawings represent the same or similar elements unless otherwise represented. The implementations set forth in the following description of illustrative embodiments do not represent all implementations consistent with the disclosure. Instead, they are merely examples of apparatuses and methods consistent with aspects related to embodiments of the disclosure as recited in the appended claims.

Terms used in embodiments of the present disclosure are for describing some embodiments only, and are not intended to limit the embodiments of the present disclosure. As used in embodiments of the present disclosure and the appended claims, "a/an", "said" and "the" in singular forms are also intended to include plural forms unless the context clearly indicates otherwise. It could also be understood that the term "and/or" as used herein refers to and includes any and all possible combinations of one or more associated listed items.

It could be understood that although the embodiments of the present disclosure may use the terms "first", "second", "third", etc. to describe various information, but the information is not limited to these terms. These terms are only used to distinguish information of the same type from each other. For example, without departing from the scope of embodiments of the present disclosure, first information may also be called second information, and similarly, second information may also be called first information. Depending on the context, the word "if" as used herein may be interpreted as "upon" or "when" or "in response to determining".

FIG. 1 is a schematic diagram illustrating a wireless communication system in some embodiments of the present disclosure. As shown in FIG. 1, the wireless communication system is a communication system based on cellular mobile communication technology, and the wireless communication system may include several terminals 11 and several base stations 12.

The terminal 11 may be a device that provides voice and/or data connectivity to a user. The terminal 11 may communicate with one or more core networks via a radio access network (RAN). The terminal 11 may be an Internet of Things terminal, such as a sensor device, a mobile phone (or called a "cellular" phone) and a computer having an Internet of Things terminal. For example, the terminal 11 may be a fixed, portable, pocket, hand-held, built-in computer or vehicle-mounted device. For example, the terminal 11 may be a station (STA), a subscriber unit, a subscriber station, a mobile station, a mobile, a remote station, an access point, a remote terminal, an access terminal, a user terminal, a user agent, a user device, or a user equipment (UE). Alternatively, the terminal 11 may be a device of an unmanned aerial vehicle. Alternatively, the terminal 11 may be a vehicle-mounted device, for example, a trip computer with a wireless communication function, or a wireless communication device externally connected to the trip computer. Alternatively, the terminal 11 may also be a roadside device, for example, it may be a street lamp, a signal lamp, or other roadside devices with a wireless communication function.

The base station 12 may be a network side device in a wireless communication system. The wireless communication system may be the fourth generation mobile communication technology (4G) system, also known as a long term evolution (LTE) system. Alternatively, the wireless communication system may also be the fifth generation mobile communication technology (5G) system, also called a new radio (NR) system or 5G NR system. Alternatively, the wireless communication system may also be a next generation system of the 5G system. An access network in the 5G system may be called a new generation-radio access network (NG-RAN). Alternatively, the wireless communication system may also be a MTC system.

The base station 12 may be an evolved base station (eNB) adopted in a 4G system. Alternatively, the base station 12 may also be a central distributed architecture base station (gNB) in the 5G system. When the base station 12 adopts a central distributed architecture, the base station 12 generally includes a central unit (CU) and at least two distributed units (DU). The central unit is provided with a protocol stack of a packet data convergence protocol (PDCP) layer, a radio link control (RLC) layer, or a media access control (MAC) layer. A protocol stack of a physical (PHY) layer is provided in the distributed unit. The specific implementation manner of the base station 12 is not limited in embodiments of the present disclosure.

A wireless connection may be established between the base station 12 and the terminal 11 through a wireless air interface. In some embodiments, the wireless air interface is a wireless air interface based on the fourth generation mobile communication network technology (4G) standard. Alternatively, the wireless air interface is a wireless air interface based on the fifth generation mobile communication network technology (5G) standard. For example, the wireless air interface is a new radio. Alternatively, the wireless air interface may also be a wireless air interface based on a next generation mobile communication network technology standard based on 5G.

In some embodiments, an E2E (end to end) connection may also be established between terminals 11, such as a V2V (vehicle to vehicle) communication, a V2I (vehicle to infrastructure) communication and a V2P (vehicle to pedestrian) communication in vehicle to everything (V2X) communication scenes.

In some embodiments, the above-mentioned wireless communication system may further include a network management device 13.

Several base stations 12 are connected to the network management device 13 respectively. The network management device 13 may be a core network device in the wireless communication system. For example, the network management device 13 may be a mobility management entity (MME) in an evolved packet core network (EPC). Alternatively, the network management device may also be other core network devices, such as a serving gate way (SGW), a public data network gateway (PGW), a policy and charging rules function unit (PCRF) or a home subscriber server (HSS). The implementation form of the network management device 13 is not limited in embodiments of the present disclosure.

Execution entities involved in embodiments of the present disclosure include, but are not limited to, a user equipment (UE) in a cellular mobile communication system, and a base station for cellular mobile communication.

FIG. 2 is a flow chart illustrating a satellite communication method according to an illustrative embodiment. As shown in FIG. 2, the satellite communication method in embodiments of the present disclosure includes the following step 201 to 202.

In step 201, a core network communicates with a user equipment UE via an inter-satellite link or an intra-satellite link using a first communication satellite.

In some embodiments, both the core network and the service server are located in the interplanetary space, that is, both the core network and the service server are located on a communication satellite. When a satellite terminal or a user equipment communicates with an access satellite through a ground station, after the access satellite receives an access communication signal, communication access is directly performed with the user equipment in the interplanetary space, such that there is no need to transfer a communication request of the user equipment to the core network on the ground for processing, thus shortening the connection link of the satellite communication, and improving communication quality of a satellite communication system.

In some embodiments, the intra-satellite link is a connection link established between communication interfaces or data interfaces located on the same communication satellite.

In step 202, the core network communicates with a service server via the inter-satellite link or the intra-satellite link.

In some embodiments, after the core network receives the communication request sent by the user equipment, the core network receives the communication request of the UE, or the satellite terminal sent by the first communication satellite based on the inter-satellite link or the intra-satellite link. In response to the communication request, the communication request is forwarded by the core network to the service server based on the inter-satellite link or the intra-satellite link. After the response based on the communication request sent by the service server is received, the response is sent by the core network to the UE or the satellite terminal using the first communication satellite. Here, the first communication satellite serves as an access satellite of the UE or the satellite terminal, and receives the communication request sent by the satellite terminal, or receives the communication request of the UE forwarded by the satellite ground station.

In some embodiments, the communication request carries identification information of a target UE or a target satellite terminal. When the core network determines that the identification of the UE or the satellite terminal needs to be connected to the identification of the target UE the target satellite terminal based on the communication request, the core network searches for the target communication satellite accessed by the target UE or the target satellite terminal, and forwards the communication request to the target communication satellite via the inter-satellite link or the intra-satellite link. After a response of the target UE or the target satellite terminal for agreeing to establish the communication connection forwarded by the target communication satellite is received by the core network, the communication link between the UE or the satellite terminal and the target UE or the target satellite terminal is established. In some embodiments, the target communication satellite may be a first communication satellite. At this time, the target UE or the target satellite terminal, and the UE or the satellite terminal that initiates the communication request are all within an access range covered by the first communication satellite. The target communication satellite may also be other communication satellites different from the first communication satellite.

The core network receives the service request of the UE sent by the first communication satellite based on the inter-satellite link or the intra-satellite link, and forwards the service request to the service server in response to the service request. The service server establishes a communication link with the UE through the core network and the first communication satellite according to the service request of the UE to provide the corresponding communication service for the UE.

In some embodiments, the core network may also actively broadcast a corresponding system broadcast message to the satellite ground station or the satellite terminal through the first communication satellite, such that the UE and the satellite terminal receive indication information on a network side based on the system broadcast message.

FIG. 3 is a schematic diagram illustrating a satellite communication architecture according to an illustrative embodiment. As shown in FIG. 3, in some embodiments, both the core network and the service server are located on the first communication satellite. That is, in the communication architecture, the first communication satellite is used as an access satellite. At the same time, both the core network and the service server are located on the first communication satellite, and the core network is connected to the first communication satellite through the intra-satellite link. For example, the core network is directly connected to the first communication satellite via a wired interface through a transmission data line, or via a wireless interface similar to near-field communication. The core network is directly connected to the service server via a wired interface through a transmission data line. Alternatively, the core network is connected to the service server via a wireless interface similar to the near-field communication. Other communication satellites serving as access satellites may be connected to the first communication satellite through the inter-satellite link to access the core network. In this way, other communication satellites may provide communication services based on the communication satellites for UEs or satellite terminals under the coverage of the communication satellites.

FIG. 4 is a schematic diagram illustrating a satellite communication architecture according to an illustrative embodiment. As shown in FIG. 4, in some embodiments, both the core network and the service server are located on a second communication satellite. The first communication satellite is connected to the second communication satellite with the inter-satellite link.

In some embodiments, the core network is located on the first communication satellite, and the service server is located on the second communication satellite.

In some embodiments, the first communication satellite and the second communication satellite are co-orbital communication satellites; or the first communication satellite is a communication satellite on a first orbit, and the second communication satellite is a communication satellite on a second orbit.

In some embodiments, in case that the first communication satellite and the second communication satellite are satellites in different orbits, the first communication satellite is a satellite in a low-earth orbit, and the second communication satellite is a satellite in a remote-earth orbit. Alternatively, the first communication satellite is a satellite in a remote-earth orbit, and the second communication satellite is a satellite in a low-earth orbit.

Figure 5:
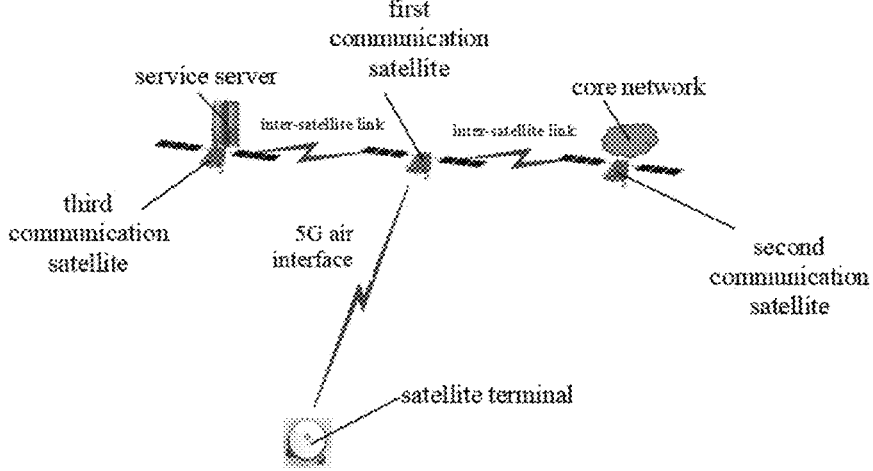
FIG. 5 is a schematic diagram illustrating yet another satellite communication architecture according to an illustrative embodiment.
Figure 6:
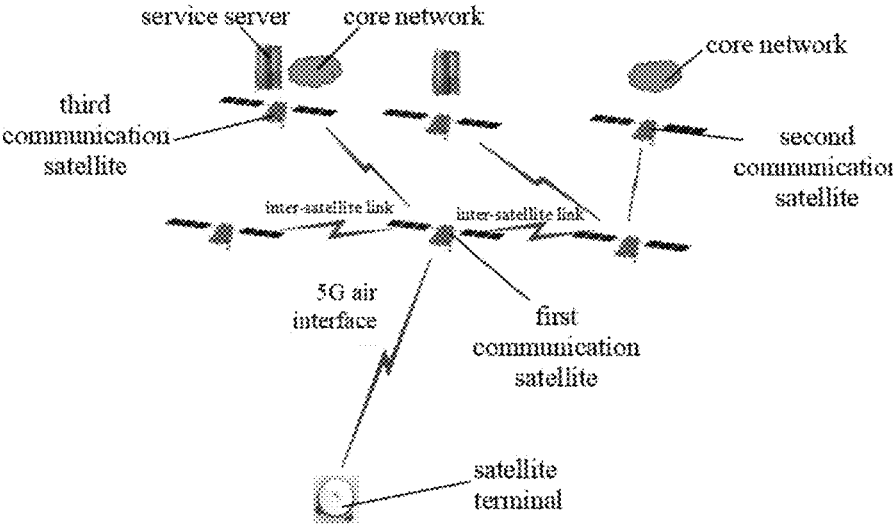
FIG. 6 is a schematic diagram illustrating a further satellite communication architecture according to an illustrative embodiment.

FIG. 5 is a schematic diagram illustrating a satellite communication architecture according to an illustrative embodiment. FIG. 6 is a schematic diagram illustrating a satellite communication architecture according to an illustrative embodiment. As shown in FIG. 5 and FIG. 6, in some embodiments, the core network is located on a second communication satellite, and the service server is located on a third communication satellite. The second communication satellite is connected to the first communication satellite with the inter-satellite link, and the third communication satellite is connected to the second communication satellite with the inter-satellite link.

In some embodiments, as shown in FIG. 5, the second communication satellite, the third communication satellite and the first communication satellite are co-orbital communication satellites.

In some embodiments, as shown in FIG. 6, the first communication satellite is a communication satellite on a first orbit, and the second communication satellite and third communication satellite are communication satellites on a second orbit. In FIG. 6, the core network on different communication satellites means that the core network may be located on a communication satellite alone, or the core network and the service server may be located on a communication satellite together, which does not mean that a plurality of core networks need to be provided.

In some embodiments, the second communication satellite and the first communication satellite are first orbit satellites, and the third communication satellite is a second orbit satellite.

In some embodiments, the first communication satellite is a communication satellite on a first orbit, the second communication satellite is a communication satellite on a second orbit, and the third communication satellite is a communication satellite on a third orbit. In some embodiments of the present disclosure, the first orbit, the second orbit and the third orbit are circulating orbits at different distances from the ground.

Figures 7, 8:
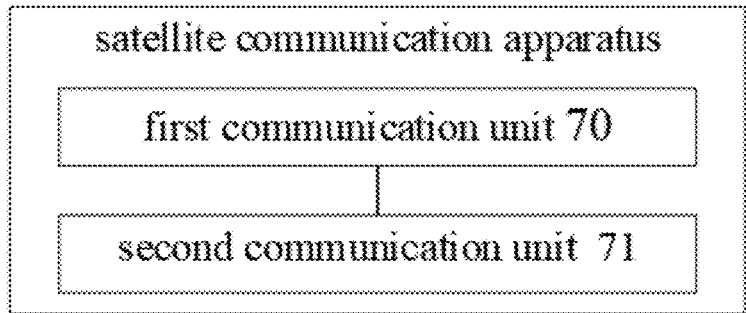
FIG. 7 is a schematic diagram illustrating a satellite communication apparatus according to an illustrative embodiment.
FIG. 8 is a schematic diagram illustrating a user equipment according to an illustrative embodiment.

FIG. 7 is a schematic diagram illustrating a satellite communication apparatus according to an illustrative embodiment. As shown in FIG. 7, the satellite communication apparatus in embodiments of the present disclosure includes a first communication unit 70 and a second communication unit 71.

The first communication unit 70 is configured to communicate with a user equipment UE via an inter-satellite link or an intra-satellite link using a first communication satellite.

The second communication unit 71 is configured to communicate with a service server via the inter-satellite link or the intra-satellite link.

In some embodiments, both the satellite communication apparatus and the service server are located on the first communication satellite.

In some embodiments, both the satellite communication apparatus and the service server are located on a second communication satellite. The first communication satellite is connected to the second communication satellite with the inter-satellite link.

In some embodiments, the satellite communication apparatus is located on the first communication satellite, and the service server is located on a second communication satellite. The first communication satellite is connected to the second communication satellite with the inter-satellite link.

In some embodiments, the first communication satellite and the second communication satellite are co-orbital communication satellites; or the first communication satellite is a communication satellite on a first orbit, and the second communication satellite is a communication satellite on a second orbit.

In some embodiments, the satellite communication apparatus is located on a second communication satellite, and the service server is located on a third communication satellite. The second communication satellite is connected to the first communication satellite with the inter-satellite link, and the third communication satellite is connected to the second communication satellite with the inter-satellite link.

In some embodiments, the second communication satellite, the third communication satellite, and the first communication satellite are co-orbital communication satellites. Alternatively, the first communication satellite is a communication satellite on a first orbit, and the second communication satellite and the third communication satellite are communication satellites on a second orbit. Alternatively, the second communication satellite and the first communication satellite are first orbit satellites, and the third communication satellite is a second orbit satellite. Alternatively, the first communication satellite is a communication satellite on a first orbit, the second communication satellite is a communication satellite on a second orbit, and the third communication satellite is a communication satellite on a third orbit.

In some embodiments, the intra-satellite link is a connection link established between communication interfaces or data interfaces within the same communication satellite.

In some embodiments, the first communication unit 70 and the second communication unit 71 may be implemented by one or more central processing units (CPU), graphics processing units (GPU), baseband processors (BP), application specific integrated circuits (ASIC), DSPs, programmable logic devices (PLD), complex programmable logic devices (CPLD), field programmable gate arrays (FPGA), general-purpose processors, controllers, microcontroller units (MCU), microprocessors, or other electronic elements, and may also be implemented in combination with one or more radio frequency (RF) antennas to perform the steps of the satellite communication method in the above-mentioned embodiments.

In embodiments of the present disclosure, the specific manners for performing operations of individual modules and units in the satellite communication apparatus shown in FIG. 7 have been described in detail in embodiments of the satellite communication method, which will not be described in detail here.

FIG. 8 is a block diagram illustrating a user equipment 8000 according to an illustrative embodiment. For example, the user equipment 8000 may be a mobile phone, a computer, a digital broadcast terminal, a messaging device, a game console, a tablet device, a medical device, a fitness device, a personal digital assistant, and the like.

Referring to FIG. 8, the user equipment 8000 may include one or more of the following components: a processing component 8002, a memory 8004, a power component 8006, a multimedia component 8008, an audio component 8010, an input/output (I/O) interface 8012, a sensor component 8014, and a communication component 8016.

The processing component 8002 generally controls the overall operations of the user equipment 8000, such as operations associated with display, telephone calls, data communications, camera operations, and recording operations. The processing component 8002 may include one or more processors 8020 to execute instructions to complete all or part of the steps of the above-mentioned method. In addition, the processing component 8002 may include one or more modules to facilitate the interaction between processing component 8002 and other components. For example, processing component 8002 may include a multimedia module to facilitate the interaction between multimedia component 8008 and the processing component 8002.

The memory 8004 is configured to store various types of data to support the operation of the user equipment 8000. Examples of these data include instructions for any application or method operating on the user equipment 8000, e.g., contact data, phonebook data, messages, pictures, videos and the like. The memory 8004 may be implemented by any type of volatile or non-volatile storage device or a combination thereof, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic disk or an optical disk.

The power component 8006 provides power to various components of the user equipment 8000. The power components 8006 may include a power management system, one or more power sources, and other components associated with the generation, management, and distribution of power in the user equipment 8000.

The multimedia component 8008 includes a screen that provides an output interface between the user equipment 8000 and the user. In some embodiments, the screen may include a liquid crystal display (LCD) and a touch panel (TP). If the screen includes a touch panel, the screen may be implemented as a touch screen to receive input signals from a user. The touch panel includes one or more touch sensors to sense touches, slides, and gestures on the touch panel. The touch sensor may not only sense a boundary of a touch or slide action, but also detect duration and pressure associated with the touch or slide action. In some embodiments, the multimedia component 8008 includes a front camera and/or a rear camera. When the user equipment 8000 is in an operation mode, such as a shooting mode or a video mode, the front camera and/or the rear camera may receive external multimedia data. Each of the front camera and the rear camera may be a fixed optical lens system or have focal and optical zoom capability.

The audio component 8010 is configured to output and/or input audio signals. For example, the audio component 8010 includes a microphone (MIC). When the user equipment 8000 is in an operation mode, such as a call mode, a recording mode, and a voice recognition mode, the microphone is configured to receive external audio signals. The received audio signals may be further stored in the memory 8004 or transmitted via the communication component 8016. In some embodiments, the audio component 8010 further includes a speaker for outputting audio signals.

The I/O interface 8012 provides an interface between the processing component 8002 and a peripheral interface module. The peripheral interface module may be keyboards, click wheels, buttons or the like. These buttons may include, but are not limited to, a home button, a volume button, a start button, and a lock button.

The sensor component 8014 includes one or more sensors for providing the user equipment 8000 with status assessments in various aspects. For example, the sensor component 8014 may detect the on/off status of the user equipment 8000 and the relative positioning of components. For example, the component is the display and the keypad of the user equipment 8000. The sensor component 8014 may also detect the position change of the user equipment 8000 or a component of the user equipment 8000, the presence or absence of contact between the user and the user equipment 8000, the orientation or acceleration/deceleration of the user equipment 8000, and the temperature change of user equipment 8000. The sensor assembly 8014 may include a proximity sensor configured to detect the presence of nearby objects without any physical contact. The sensor component 8014 may also include a light sensor, such as a CMOS or CCD image sensor, for imaging applications. In some embodiments, the sensor component 8014 may also include an acceleration sensor, a gyroscope sensor, a magnetic sensor, a pressure sensor or a temperature sensor.

The communication component 8016 is configured to facilitate wired or wireless communication between the user equipment 8000 and other devices. The user equipment 8000 may access wireless networks based on communication standards, such as Wi-Fi, 2G, 3G, or a combination thereof. In an illustrative embodiment, the communication component 8016 receives broadcast signals or broadcast related information from an external broadcast management system via a broadcast channel. In an illustrative embodiment, the communication component 8016 further includes a near field communication (NFC) module to facilitate short-range communication. For example, the NFC module may be implemented based on a radio frequency identification (RFID) technology, an infrared data association (IrDA) technology, an ultra-wideband (UWB) technology, a Bluetooth (BT) technology and other technologies.

In an illustrative embodiment, the user equipment 8000 may be implemented by one or more application specific integrated circuits (ASICs), digital signal processors (DSPs), digital signal processing devices (DSPDs), programmable logic devices (PLDs), field-programmable gate arrays (FPGAs), controllers, microcontrollers, microprocessors, or other electronic elements, for performing the above-mentioned method.

In an illustrative embodiment, there is also provided a non-transitory computer-readable storage medium having stored therein instructions, such as a memory 8004 including instructions, which may be executed by the processor 8020 of the user equipment 8000 to implement the above-mentioned method. For example, the non-transitory computer readable storage medium may be a ROM, a random access memory (RAM), a CD-ROM, a magnetic tape, a floppy disc, an optical data storage device or the like.

In some embodiments, a core network element is provided. The core network element includes a processor, a transceiver, and a memory for storing executable programs capable of being run by the processor. The processor is configured to execute the executable programs to perform steps of the above-mentioned satellite communication method.

In the satellite communication method, the satellite communication apparatus, the core network element, and the storage medium according to embodiments of the present disclosure, the core network and the service server are directly located in the interplanetary space, and the satellite terminal or the user equipment directly communicates with the core network and the service server using an access satellite, such that there is no need to make satellite signals access the mobile core network and the service server on the ground. Therefore, compared with the communication mode of retransmitting communication signals from the access satellite to the ground, the communication link in embodiments of the present disclosure is reduced by at least half, such that the communication delay is shorter, thus improving the satellite communication service effect and the user experience.

Other embodiments of the present disclosure will be apparent to those skilled in the art from consideration of the specification and practice of the present disclosure described here. The present disclosure is intended to cover any variations, uses, or adaptations of the embodiments of the present disclosure following the general principles thereof and including such departures from the embodiments of the present disclosure as come within known or customary practice in the art. It is intended that the specification and examples be considered as exemplary only, with a true scope and spirit of the embodiments of the present disclosure being indicated by the following claims.

It will be appreciated that the embodiments of the present disclosure are not limited to the exact construction that has been described above and illustrated in the accompanying drawings, and that various modifications and changes can be made without departing from the scope thereof. It is intended that the scope of the embodiments of the present disclosure only be limited by the appended claims.

What is claimed is:

1. A satellite communication method, comprising:
communicating with a user equipment UE via an inter-satellite link or an intra-satellite link by a core network using a first communication satellite; and
communicating with a service server via the inter-satellite link or the intra-satellite link by the core network;
wherein the core network and the service server are located on a same communication satellite or different communication satellites, and the service server is used to provide a communication service to the UE;
wherein communicating with the service server via the inter-satellite link or the intra-satellite link by the core network comprises:
receiving a service request of the UE sent by the first communication satellite based on the inter-satellite link or the intra-satellite link, and
forwarding the service request to the service server in response to the service request, to enable the service server to establish a communication link with the UE through the core network and the first communication satellite according to the service request of the UE to provide the communication service for the UE;

wherein the core network is located on a second communication satellite, and the service server is located on a third communication satellite;

the second communication satellite is connected to the first communication satellite with the inter-satellite link, and the third communication satellite is connected to the second communication satellite with the inter-satellite link.

2. The method according to claim 1, wherein both the core network and the service server are located on the first communication satellite.

3. The method according to claim 1, wherein both the core network and the service server are located on the second communication satellite;

the first communication satellite is connected to the second communication satellite with the inter-satellite link.

4. The method according to claim 1, wherein the core network is located on the first communication satellite, and the service server is located on the second communication satellite;

the first communication satellite is connected to the second communication satellite with the inter-satellite link.

5. The method according to claim 3, wherein the first communication satellite and the second communication satellite are co-orbital communication satellites.

6. The method according to claim 1, wherein the second communication satellite, the third communication satellite, and the first communication satellite are co-orbital communication satellites.

7. The method according to claim 1, wherein the intra-satellite link is a connection link established between communication interfaces or data interfaces within the same communication satellite.

8. The method according to claim 3, wherein the first communication satellite is a communication satellite on a first orbit, and the second communication satellite is a communication satellite on a second orbit.

9. The method according to claim 1, wherein the first communication satellite is a communication satellite on a first orbit, and the second communication satellite and the third communication satellite are communication satellites on a second orbit.

10. The method according to claim 1, wherein the second communication satellite and the first communication satellite are communication satellites on a first orbit, and the third communication satellite is a communication satellite on a second orbit.

11. The method according to claim 1, wherein the first communication satellite is a communication satellite on a first orbit, the second communication satellite is a communication satellite on a second orbit, and the third communication satellite is a communication satellite on a third orbit.

12. A core network element, comprising:

a processor;

a transceiver; and a memory for storing executable programs capable of being run by the processor;

wherein the processor is configured to:

communicate with a user equipment UE via an inter-satellite link or an intra-satellite link by a core network using a first communication satellite; and communicate with a service server via the inter-satellite link or the intra-satellite link by the core network;

wherein the core network and the service server are located on a same communication satellite or different communication satellites, and the service server is used to provide a communication service to the UE;

wherein the processor is further configured to:

receive a service request of the UE sent by the first communication satellite based on the inter-satellite link or the intra-satellite link, and forward the service request to the service server in response to the service request, to enable the service server to establish a communication link with the UE through the core network and the first communication satellite according to the service request of the UE to provide the communication service for the UE;

wherein the core network is located on a second communication satellite, and the service server is located on a third communication satellite;

the second communication satellite is connected to the first communication satellite with the inter-satellite link, and the third communication satellite is connected to the second communication satellite with the inter-satellite link.

13. The core network element according to claim 12, wherein both the core network and the service server are located in the first communication satellite.

14. The core network element according to claim 12, wherein both the core network and the service server are located in the second communication satellite;

the first communication satellite is connected to the second communication satellite with the inter-satellite link.

15. The core network element according to claim 12, wherein the core network is located in the first communication satellite, and the service server is located in the second communication satellite;

the first communication satellite is connected to the second communication satellite with the inter-satellite link.

16. The core network element according to claim 14, wherein the first communication satellite and the second communication satellite are co-orbital communication satellites.

17. The core network element according to claim 14, wherein the first communication satellite is a communication satellite on a first orbit, and the second communication satellite is a communication satellite on a second orbit.

18. A non-transitory storage medium having stored therein executable programs that, when executed by a processor, cause the processor to:

communicate with a user equipment UE via an inter-satellite link or an intra-satellite link by a core network using a first communication satellite; and communicate with a service server via the inter-satellite link or the intra-satellite link by the core network;

wherein the core network and the service server are located on a same communication satellite or different communication satellites, and the service server is used to provide a communication service to the UE;

wherein the executable programs, when executed by the processor, further cause the processor to:

receive a service request of the UE sent by the first communication satellite based on the inter-satellite link or the intra-satellite link, and forward the service request to the service server in response to the service request, to enable the service server to establish a communication link with the UE through the core network and the first communication satellite according to the service request of the UE to provide the communication service for the UE;

wherein the core network is located on a second communication satellite, and the service server is located on a third communication satellite;

the second communication satellite is connected to the first communication satellite with the inter-satellite link, and the third communication satellite is connected to the second communication satellite with the inter-satellite link.

\* \* \* \* \*